(12) United States Patent
Gupta

(10) Patent No.: US 7,203,261 B2
(45) Date of Patent: Apr. 10, 2007

(54) PHASE LOCKED LOOP FOR AN OFDM SYSTEM

(75) Inventor: Alok Kumar Gupta, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 487 days.

(21) Appl. No.: 10/413,700

(22) Filed: Apr. 15, 2003

(65) Prior Publication Data

US 2004/0196915 A1    Oct. 7, 2004

Related U.S. Application Data

(60) Provisional application No. 60/461,169, filed on Apr. 7, 2003.

(51) Int. Cl.
*H03D 3/24* (2006.01)
(52) U.S. Cl. .................... 375/376; 375/374; 375/375
(58) Field of Classification Search ............... 375/376, 375/373, 367, 327, 316, 324, 378, 259, 359, 375/374, 375, 260, 261, 348; 370/208, 345; 455/424.7
See application file for complete search history.

(56) References Cited

U.S. PATENT DOCUMENTS 6,473,394 B1 * 10/2002 Marchok et al. ............ 370/208
6,560,209 B1 * 5/2003 Alamouti et al. ........... 370/330
6,928,120 B1 * 8/2005 Zhang ........................ 375/260

2003/0058952 A1 * 3/2003 Webster et al. ............. 375/260
2003/0123582 A1 * 7/2003 Kim et al. .................. 375/347
2003/0128660 A1 * 7/2003 Ito et al. ..................... 370/210

OTHER PUBLICATIONS

Speth, Michael et al., Optimum Receiver Design for Wireless Broad-Band Systems Using OFDM-Part I, *IEEE Transactions on Communications*, vol. 47, No. 11 (Nov. 1999).
Speth, Michael et al., Optimum Receiver Design for OFDM-Based Broadband Transmission-Part II, *IEEE Transactions on Communications*, vol. 49, No. 4 (Apr. 2001).

* cited by examiner

*Primary Examiner*—Jay K. Patel
*Assistant Examiner*—Qutub Ghulamali
(74) *Attorney, Agent, or Firm*—Thomas R. Rouse; Sandip S. Minhas; Peng Zhu

(57) ABSTRACT

Techniques are provided for tracking residual frequency error and phase noise in an OFDM system. At a receiver, each received OFDM symbol is transformed with an FFT to obtain received modulation symbols, which are serialized. A phase locked loop (PLL) operates on the serialized received modulation symbols and provides an independent phase correction value for each received modulation symbol. Each received modulation symbol is corrected with its own phase correction value to obtain a phase-corrected symbol. The phase error in each phase-corrected symbol is detected to obtain a phase error estimate for that phase-corrected symbol. The phase error estimate for each phase-corrected symbol is filtered (e.g., with a second-order loop filter) to obtain a frequency error estimate, which is accumulated to obtain a phase correction value for another received modulation symbol. The phase-corrected symbols are not correlated because independent phase correction values are used for the received modulation symbols.

20 Claims, 4 Drawing Sheets

PHASE LOCKED LOOP FOR AN OFDM SYSTEM

CROSS-REFERENCE TO RELATED APPLICATION

This application claims the benefit of priority of U.S. Provisional Patent Application entitled "PHASED LOCKED LOOP FOR AN OFDM SYSTEM" 60/461169, filed on Apr. 7, 2003, pending, which application is incorporated herein by reference.

BACKGROUND

I. Field

The present invention relates generally to data communication, and more specifically to techniques for tracking residual frequency error and phase noise in an orthogonal frequency division multiplexing (OFDM) communication system.

II. Background

Wireless communication systems are widely deployed to provide various communication services such as voice, packet data, and so on. These systems may utilize OFDM, which is a modulation technique capable of providing high performance for some wireless environments. OFDM effectively partitions the overall system bandwidth into a number of ($N_S$) orthogonal subbands, which are also commonly referred to as tones, sub-carriers, bins, and frequency subchannels. With OFDM, each subband is associated with a respective sub-carrier that may be modulated with data.

In some OFDM systems, only $N_D$ subbands are used for data transmission, $N_P$ subbands are used for pilot transmission, and $N_G$ subbands are not used and serve as guard subbands to allow the systems to meet spectral mask requirements, where $N_S = N_D + N_P + N_G$. For example, an IEEE 802.11a system has 64 total subbands, 48 data subbands, 4 pilot subbands, and 12 guard subbands (i.e., $N_S=64$, $N_D=48$, $N_P=4$, and $N_G=12$). In each OFDM symbol period, one data modulation symbol (or simply, "data symbol") may be transmitted on each of the $N_D$ data subbands, one pilot modulation symbol (or simply, "pilot symbol") may be transmitted on each of the $N_P$ pilot subbands, and a signal value of zero is provided for each of the $N_G$ guard subbands. Each modulation symbol is a complex value for a specific point in a signal constellation for the modulation scheme used for that modulation symbol. The pilot symbols are known a priori at both the transmitter and receiver.

In an OFDM system, a transmitter initially codes, interleaves, and modulates a stream of information bits to obtain a stream of data modulation symbols. In each OFDM symbol period, $N_D$ data symbols, $N_P$ pilot symbols, and $N_G$ zero signal values (i.e., $N_S$ symbols for all $N_S$ subbands) are transformed to the time domain using an inverse fast Fourier transform (IFFT) to obtain a "transformed" symbol that contains $N_S$ complex-value chips. To combat frequency selective fading (i.e., a frequency response that varies across the $N_S$ subbands), which is caused by multipath in the wireless link, a portion of each transformed symbol is typically repeated. The repeated portion is often referred to as a cyclic prefix and includes $N_{cp}$ chips. An OFDM symbol is formed by the transformed symbol and its cyclic prefix. Each OFDM symbol contains $N_S+N_{cp}$ chips and has a duration of $N_S+N_{cp}$ chip periods, which is one OFDM symbol period. The OFDM symbols are further processed and transmitted to a receiver.

The receiver performs the complementary processing, obtains $N_S+N_{cp}$ input samples for each received OFDM symbol, and removes the cyclic prefix from each received OFDM symbol to obtain a received transformed symbol. Each received transformed symbol is then transformed to the frequency domain using a fast Fourier transform (FFT) to obtain $N_S$ "received" symbols for the $N_S$ subbands. The received pilot symbols on the pilot subbands are typically used for various purposes such as channel estimation, timing acquisition, and phase/frequency tracking. The phase/frequency tracking may be implemented in various manners.

In one conventional phase/frequency tracking design, which operates on the input samples prior to the FFT, the receiver estimates frequency error in the input samples. The receiver then rotates the input samples to obtain frequency-corrected samples having the estimated frequency error removed. This open-loop design can estimate and correct for large frequency error, which can mitigate the deleterious effects of inter-carrier interference (i.e., interference from adjacent subbands). However, this design is not able to correct for residual frequency error/offset and phase noise. The residual frequency error can cause performance degradation, especially for larger-size packets and higher order modulation schemes with many points in their signal constellations.

In a second conventional phase/frequency tracking design, which operates on the received symbols after the FFT, the receiver estimates phase errors in the received pilot symbols. The receiver then averages the phase error estimates for all received pilot symbols for each OFDM symbol period to obtain a common phase correction value for all subbands. The receiver then corrects all received symbols for that OFDM symbol period with the common phase correction value to obtain phase-corrected symbols. This design can correct for residual frequency error. However, the use of a common phase correction value for all received symbols in each OFDM symbol period results in correlation among the phase-corrected symbols. This correlation typically does not affect the performance of an uncoded communication system. However, for a coded communication system that employs forward error correction coding (e.g., convolutional or turbo coding), the performance of the decoder at the receiver may be adversely affected by the correlation among the phase-corrected symbols provided to the decoder. This degradation is due to the fact that many decoders (e.g., Viterbi and turbo decoders) expect their input symbols to be uncorrelated for optimal performance. The degradation is especially noticeable for an additive white Gaussian noise (AWGN) channel, i.e., a wireless link with flat fading.

There is therefore a need in the art for techniques to track residual frequency error and phase noise without introducing correlation among the phase-corrected symbols.

SUMMARY

Techniques are provided herein for tracking residual frequency error and phase noise in an OFDM system while avoiding correlation among the phase-corrected symbols. At the receiver, each received OFDM symbol is transformed with an FFT to obtain received modulation symbols, which are serialized to form a sequence of received modulation symbols. A phase locked loop (PLL) operates on the serialized received modulation symbols and provides an independent (i.e., separate) phase correction value for each of the received modulation symbols. Each received modulation symbol is corrected with its own phase correction value to obtain a phase-corrected symbol. Because independent phase correction values are used for the received modulation symbols, the phase-corrected symbols are not correlated by a common phase correction value.

In an embodiment, a method is provided for tracking frequency error in an OFDM system. In accordance with the method, received modulation symbols are obtained from the FFT and serialized. The received modulation symbols may include received pilot and data modulation symbols or only received data modulation symbols (i.e., pilot symbols are useful but not required). Subsequent processing is performed on one serialized received modulation symbol at a time. Each received modulation symbol is corrected with a respective phase correction value to obtain a corresponding phase-corrected symbol. The phase error in each phase-corrected symbol is detected to obtain a phase error estimate for that phase-corrected symbol. The phase error estimate for each phase-corrected symbol is filtered (e.g., with a second order loop filter) to obtain a frequency error estimate, which is further accumulated to obtain a phase correction value for another received modulation symbol.

The techniques described herein provide various advantages including: (1) uncorrelated phase-corrected symbols, which can improve decoder performance, (2) faster rate of operation for the PLL (i.e., at the serialized received modulation symbol rate instead of the received OFDM symbol rate), which allows for a wider loop bandwidth, faster acquisition time, and faster convergence, and (3) support of a decision-directed mode of operation whereby only received data modulation symbols are needed for frequency tracking.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
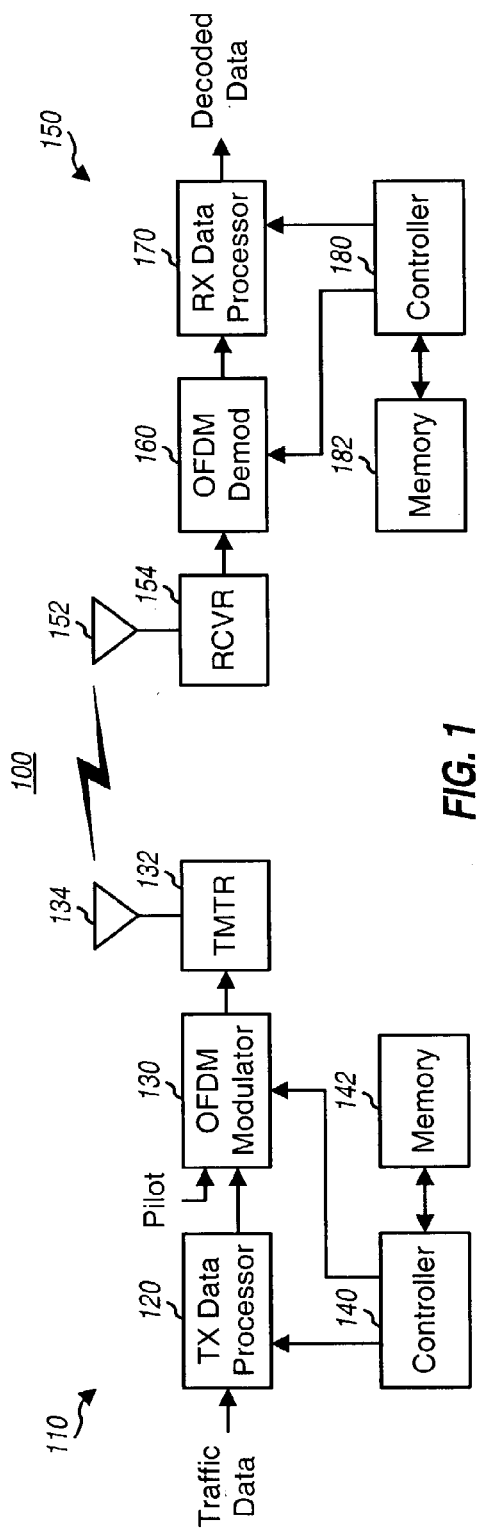
FIG. 1 shows a transmitter system and a receiver system in an OFDM system.

FIG. 1 shows a block diagram of a transmitter system 110 and a receiver system 150 in an OFDM system 100. At transmitter system 110, a transmit (TX) data processor 120 receives, formats, codes, interleaves, and modulates traffic data (i.e., information bits) to provide modulation symbols. The coding increases the reliability of the data transmission. TX data processor 120 may perform error detection coding (e.g., CRC coding), forward error correction coding (e.g., convolutional coding, turbo coding, and/or block coding), or a combination thereof. The interleaving provides time and/or frequency diversity against deleterious path effects. The modulation (i.e., symbol mapping) may be performed such that the same or different modulation schemes are used for the pilot and data subbands. The modulation scheme used for each subband may be QPSK, M-PSK, M-QAM, and so on.

An OFDM modulator 130 receives and processes the data symbols and pilot symbols to provide a stream of OFDM symbols. The processing by OFDM modulator 130 may include (1) multiplexing the data symbols, pilot symbols, and zero signal values onto the data subbands, pilot subbands, and guard subbands, respectively, (2) transforming the $N_S$ data and pilot symbols and zero signal values for each OFDM symbol period with an $N_S$-point IFFT to obtain a transformed symbol, and (3) appending a cyclic prefix to each transformed symbol to form a corresponding OFDM symbol. The pilot symbols may be multiplexed with the data symbols using, for example, subband multiplexing or time division multiplexing (TDM). For subband multiplexing, the pilot and data symbols are transmitted on different subbands. For TDM, the pilot and data symbols are transmitted in different OFDM symbol periods.

A transmitter unit (TMTR) 132 receives and converts the stream of OFDM symbols into one or more analog signals and further conditions (e.g., amplifies, filters, and frequency upconverts) the analog signals to generate a modulated signal suitable for transmission over the wireless channel. The modulated signal is then transmitted via an antenna 134 to receiver system 150.

At receiver system 150, the transmitted signal is received by an antenna 152 and provided to a receiver unit (RCVR) 154. Receiver unit 154 conditions (e.g., filters, amplifies, and frequency downconverts) the received signal and digitizes the conditioned signal to provide a stream of input samples. An OFDM demodulator 160 then receives and processes the input samples to provide phase-corrected symbols. The processing by OFDM demodulator 160 may include (1) removing the cyclic prefix appended to each received OFDM symbol to obtain a received transformed symbol, (2) transforming each received transformed symbol with an $N_S$-point FFT to obtain $N_S$ received symbols for the $N_S$ subbands, and (3) correcting the phase of the received symbols to obtain the phase-corrected symbols. The $N_S$ received symbols for each OFDM symbol period include $N_D$ received data modulation symbols (or simply, "received data symbols") for the $N_D$ data subbands, $N_P$ received pilot modulation symbol (or simply, "received pilot symbols") for the $N_P$ pilot subbands, and $N_G$ "guard symbols" for the $N_G$ guard subbands. A receive (RX) data processor 170 then demodulates, deinterleaves, and decodes the phase-corrected symbols to provide decoded data. The processing by OFDM demodulator 160 and RX data processor 170 is complementary to that performed by OFDM modulator 130 and TX data processor 120, respectively, at transmitter system 110.

Controllers 140 and 180 direct the operation at transmitter system 110 and receiver system 150, respectively. Memory units 142 and 182 provide storage for program codes and data used by controllers 140 and 180, respectively.

Figure 2:
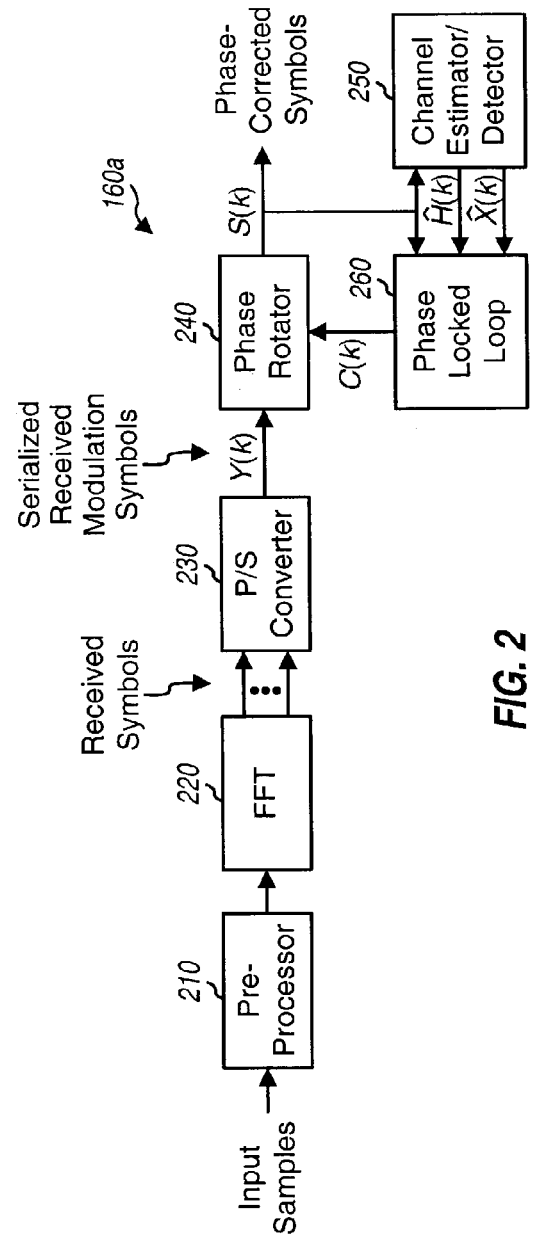
FIG. 2 shows an OFDM demodulator in the receiver system.

FIG. 2 shows a block diagram of an OFDM demodulator 160a, which is an embodiment of OFDM demodulator 160 in FIG. 1. A pre-processor 210 receives and processes the input samples from receiver unit 154 and provides pre-processed samples. Pre-processor 210 may perform sample rate conversion, coarse frequency correction, cyclic prefix removal, and so on, as described below. An FFT unit 220 performs an FFT on $N_S$ pre-processed samples for each received OFDM symbol to obtain $N_S$ received symbols for the $N_S$ subbands. A parallel-to-serial (P/S) converter 230 removes the $N_G$ guard symbols and serializes the $N_S$-$N_G$ received pilot and data symbols for each OFDM symbol period to provide a sequence of received modulation symbols, Y(k). After the serialization, the index k may be viewed as either a time-domain symbol index or a frequency-domain subband index.

A phase rotator 240 then multiplies the serialized received modulation symbols, Y(k), with an oscillator signal, C(k), and provides the phase-corrected symbols, S(k). The oscillator signal, C(k), is generated by a phase locked loop (PLL) 260 as described below. The phase of the oscillator signal, C(k), is adjusted by PLL 260 to track residual frequency error and phase noise in the serialized received modulation symbols, Y(k).

A channel estimator/detector 250 receives the phase-corrected symbols from phase rotator 240. Channel estimator/detector 250 processes the phase-corrected pilot symbols to obtain estimates of the channel coefficients for the data subbands, Ĥ(k). Channel estimator/detector 250 also processes the phase-corrected data symbols to obtain estimates of these symbols, X̂(k). Since pilot and training symbols are known a priori at the receiver system, there are no errors in the estimates of these symbols. (Training symbols, which are also referred to as a "preamble", are known OFDM symbols sent by the transmitter and used by the receiver for channel estimation, timing and frequency acquisition, and other purposes.) Channel estimator/detector 250 provides the channel coefficient estimates, Ĥ(k), and the symbol estimates, X̂(k), to PLL 260.

PLL 260 estimates the phase errors in the phase-corrected symbols, S(k), filters and accumulates the phase error estimates to obtain phase correction values, and adjusts the phase of the oscillator signal, C(k), based on the phase correction values. The oscillator signal, C(k), is used to remove residual frequency error and phase noise in the serialized received modulation symbols, Y(k). The processing units within OFDM demodulator 160a may be implemented in various manners. An exemplary design is described below.

Figure 3:
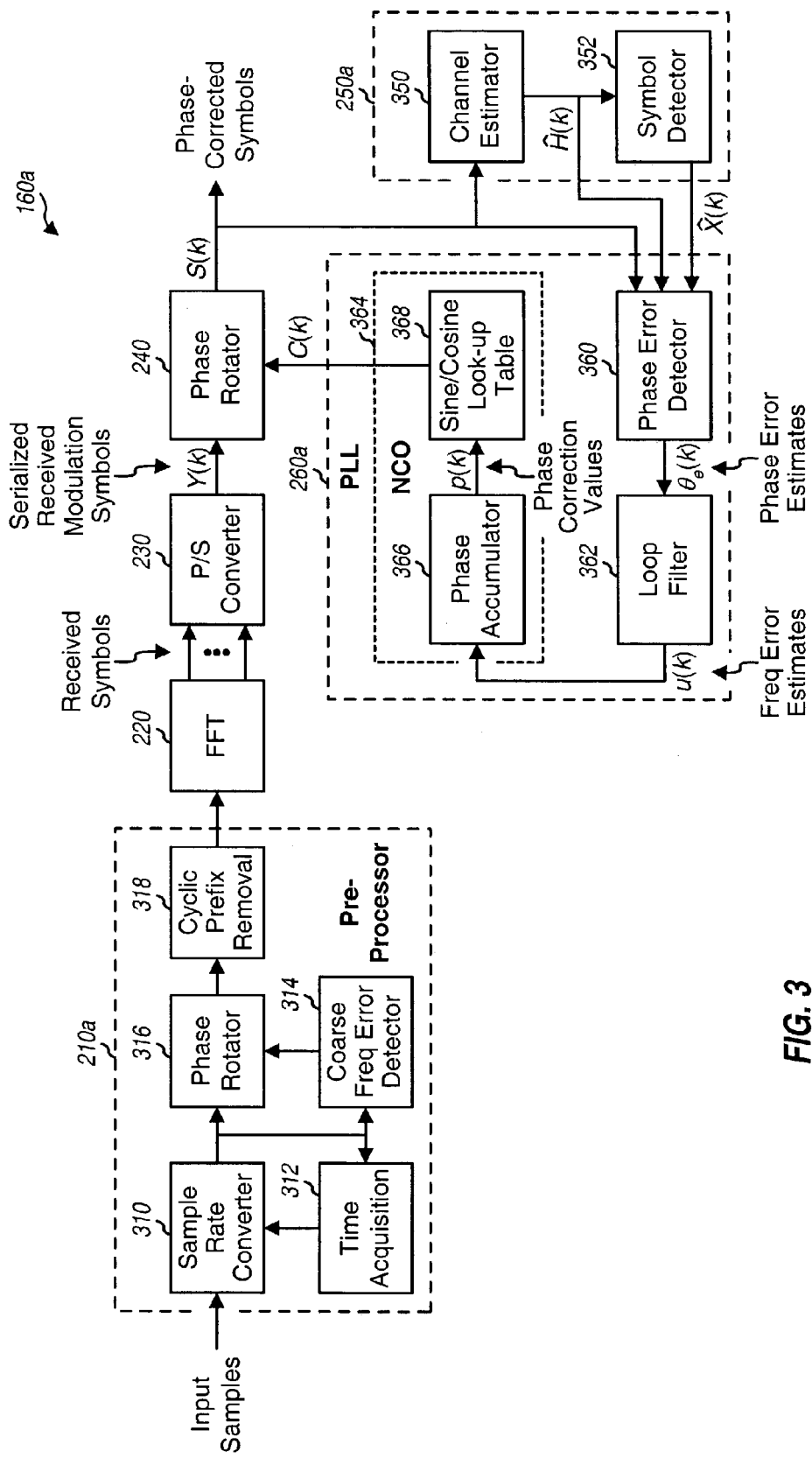
FIG. 3 shows a specific design for the OFDM demodulator with a PLL.

FIG. 3 shows a block diagram of a specific design for OFDM demodulator 160a. For this design, pre-processor 210a is an embodiment of pre-processor 210 in FIG. 2, channel estimator/detector 250a is an embodiment of channel estimator/detector 250, and PLL 260a is an embodiment of PLL 260.

Within pre-processor 210a, a sample rate converter 310 receives and converts the input samples (at the sampling rate) to interpolated samples (at the chip rate). The chip rate refers to the rate of the chips that make up the OFDM symbols at the transmitter (which is 20 Mcps for an 802.11a system). The sampling rate refers to the rate used by receiver unit 154 to digitize the received signal. The sampling rate is typically selected to be higher than the chip rate to simplify filtering at the receiver. A time acquisition unit 312 acquires the timing of the received OFDM symbols (e.g., based on a preamble), determines the boundaries of the received OFDM symbols, and provides timing signals to other units within OFDM demodulator 160a (not shown in FIG. 3 for simplicity). A coarse frequency error detector 314 obtains a coarse estimate of the frequency error in the interpolated samples. A phase rotator 316 applies coarse frequency correction to the interpolated samples and provides frequency-corrected samples. Frequency error detector 314 and phase rotator 316 estimate and remove coarse frequency error to mitigate the deleterious effects of inter-carrier interference. A cyclic prefix removal unit 318 removes the cyclic prefix appended to each OFDM symbol by the transmitter and provides the pre-processed samples.

FFT unit 220 operates as described above. P/S converter 230 discards the guard symbols and serializes the received pilot and data symbols. The serialization may be performed in various manners. In one embodiment, P/S converter 230 provides one received pilot or data symbol at a time to the serialized stream based on subband index, e.g., starting with the smallest subband index and continuing to the largest subband index. In another embodiment, P/S converter 230 evenly distributes the received pilot symbols among the received data symbols in the serialized stream. The order of the received modulation symbols in the serialized stream is typically not critical. The serialized received modulation symbols, Y(k), may be expressed as:

$$Y(k)=H(k) \cdot X(k) \cdot e^{j\phi_r(k)}+N(k), \qquad \text{Eq (1)}$$

where H(k) is the channel coefficient or gain for the wireless link for subband k;
X(k) is the data or pilot symbol transmitted on subband k;
$\phi_r(k)$ is the phase error for subband k; and
N(k) is the noise observed in subband k.

Phase rotator 240 multiplies the serialized received modulation symbols, Y(k), with the oscillator signal, C(k), and provides the phase-corrected symbols, S(k), as follows:

$$S(k)=Y(k) \cdot C(k)=Y(k) \cdot e^{-j\phi_c(k)}, \qquad \text{Eq (2)}$$

where $C(k)=e^{-j\phi_c(k)}$ and $\phi_c(k)$ is the phase correction value for subband k. Phase rotator 240 may be implemented with a complex multiplier.

Within channel estimator/detector 250a, a channel estimator 350 estimates the channel coefficient for each of the data subbands. Channel estimation may be performed by (1) obtaining estimates of the channel coefficients for the pilot subbands based on the phase-corrected pilot symbols and (2) interpolating the channel coefficient estimates for the pilot subbands to obtain the channel coefficient estimates, Ĥ(k), for the data subbands. An exemplary method for performing channel estimation is described in commonly assigned U.S. patent application Ser. No. 10/340,130, entitled "Channel Estimation for OFDM Communication Systems," filed Jan. 10, 2003. A symbol detector 352 performs detection for the received data symbols and provides symbol estimates, X̂(k). The symbol estimates for pilot and training symbols have no errors, as described above. The detection for the received data symbols may be performed by (1) dividing the phase-corrected data symbol for each data subband by the channel coefficient estimate for that subband, i.e., S(k)/Ĥ(k), and (2) "slicing" or symbol demapping the resultant symbol to obtain the symbol estimate, X̂(k). The symbol estimate is the modulation symbol most likely to have been transmitted for the received data symbol.

In the embodiment shown in FIG. 3, PLL 260a includes a phase error detector 360, a loop filter 362, and a numerically controlled oscillator (NCO) 364. NCO 364 further includes a phase accumulator 366 and a sine/cosine look-up table 368. A specific design for various components of PLL 260a is described below.

Figure 4A:
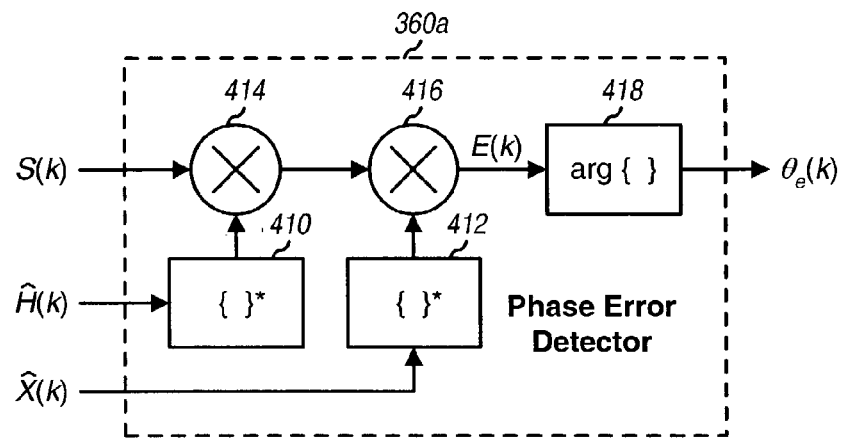
FIGS. 4A, 4B, and 4C show a phase error detector, a loop filter, and a phase accumulator, respectively, within the PLL.

FIG. 4A shows a block diagram of a phase error detector 360a, which is an embodiment of phase error detector 360 in FIG. 3. Within phase error detector 360a, the channel coefficient estimates, Ĥ(k), are conjugated by a unit 410, and the symbol estimates, X̂(k), are conjugated by a unit 412. The phase-corrected symbols, S(k), are multiplied with the conjugated channel coefficient estimates, Ĥ*(k), by a multiplier 414 and further multiplied with the conjugated symbol estimates, X̂*(k), by a multiplier 416. The output of multiplier 416, E(k), may be expressed as:

$$E(k) = \hat{H}^*(k) \cdot \hat{X}^*(k) \cdot S(k) \qquad \text{Eq (3)}$$
$$= \hat{H}^*(k) \cdot \hat{X}^*(k) \cdot$$
$$[H(k) \cdot X(k) \cdot e^{j\phi_r(k)} \cdot e^{-j\phi_c(k)} + N(k) \cdot e^{-j\phi_c(k)}],$$
$$= \hat{H}^*(k) \cdot H(k) \cdot \hat{X}^*(k) \cdot X(k) \cdot e^{j(\phi_r(k)-\phi_c(k))} + \tilde{N}(k)$$

where Ñ(k) is the post-processed noise. A unit 418 then computes the phase error estimate, $\phi_e(k)$, as follows:

$$\phi_e(k) = \arg\{E(k)\} = \arctan\left(\frac{\operatorname{Im}\{E(k)\}}{\operatorname{Re}\{E(k)\}}\right), \qquad \text{Eq (4)}$$

where arg {x} provides the phase of a complex value x.

As shown in equations (3) and (4), a phase error estimate may be obtained for each received data symbol as well as each received pilot symbol. PLL 260a may be operated in a decision-directed mode whereby only received data symbols are used for frequency tracking. The received pilot symbols are useful for the operation of PLL 260a, but they are not necessary.

Referring back to FIG. 3, loop filter 362 receives and filters the phase error estimate, $\phi_e(k)$, from phase error detector 360 and provides frequency error estimates, u(k). Loop filter 362 may be of any order and may be implemented with various types of filters.

Figure 4B:
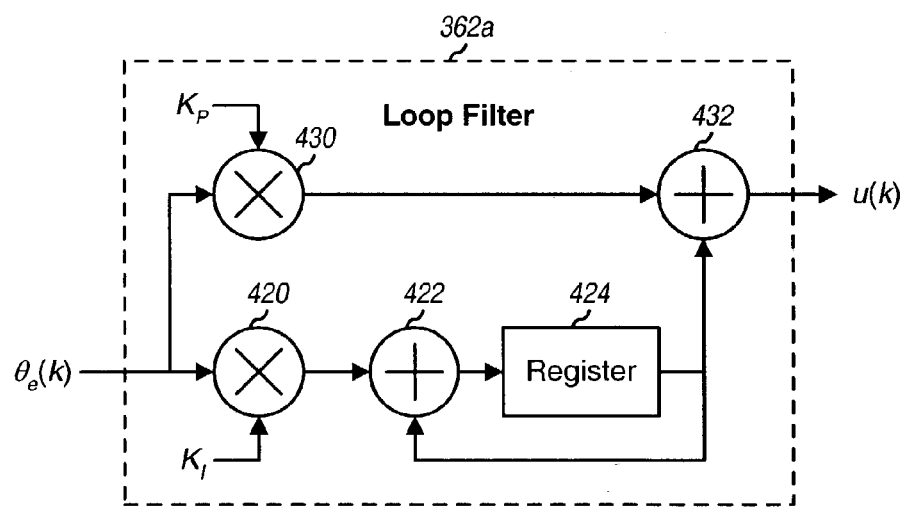

FIG. 4B shows a block diagram of a loop filter 362a, which is an embodiment of loop filter 362 in FIG. 3. Loop filter 362a is a second-order proportional-plus-integral type loop filter that can track residual frequency error. Within loop filter 362a, in the integral path, a multiplier 420 receives and scales the phase error estimate, $\phi_e(k)$, with an integral gain, $K_I$. A summer 422 sums the output of multiplier 420 with the output of a register 424. The output of summer 422 is provided to and stored by register 424. Summer 422 and register 424 form an accumulator. In the proportional path, a multiplier 430 receives and scales the phase error estimate, $\phi_e(k)$, with a proportional gain, $K_p$. A summer 432 sums the output of multiplier 430 and the output of register 424 and provides the frequency error estimate, u(k). The computation for the integral and proportional paths may be expressed as:

$$a(k)=a(k-1)+K_I \cdot \phi_e(k), \text{ and}$$
$$u(k)=a(k-1)+K_p \cdot \phi_e(k). \qquad \text{Eq (5)}$$

Each of the gains $K_I$ and $K_P$ may be selected to be a power of two. In this case, multipliers 420 and 430 may be implemented with barrel shifters or multiplexers. One set of gains $K_I$ and $K_P$ may be used for the received pilot symbols as well as the received data symbols. Alternatively, one set of gains $K_{Ip}$ and $K_{Pp}$ may be used for the received pilot symbols and another set of gains $K_{Id}$ and $K_{Pd}$ may be used for the received data symbols.

Figure 4C:
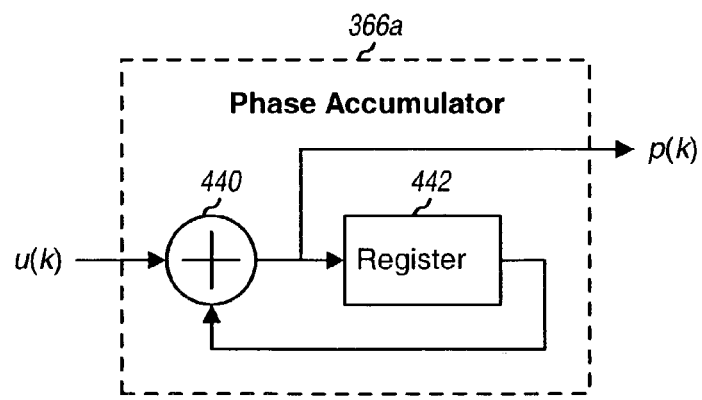

FIG. 4C shows a block diagram of a phase accumulator 366a, which is an embodiment of phase accumulator 366 within NCO 364 in FIG. 3. Within phase accumulator 366a, a summer 440 receives and sums the frequency error estimate, u(k), with the output of a register 442 and provides the phase correction value, p(k). The phase correction value, p(k), is provided to and stored by register 442. Summer 440 and register 442 form an accumulator. The computation for the phase correction value, p(k), may be expressed as:

$$p(k)=(p(k-1)+u(k))\bmod M, \qquad \text{Eq (6)}$$

where M is the maximum value for register 442 (and thus phase accumulator 366a). The mod M operation may be implemented with an accumulator that wraps around upon reaching M. In particular, only L least significant bits (LSBs) of the quantity p(k−1)+u(k) are stored in L-bit register 442, where L=log₂M. The most significant bit (MSB) of the quantity p(k−1)+u(k) is discarded. The phase correction value, p(k), from phase accumulator 366a ranges from 0 to M−1, where 0 maps to 0π and M maps to 2π.

Sine/cosine look-up table 368 receives the phase correction value, p(k), from phase accumulator 366 and provides the cosine of p(k) and the sine of p(k), which together make up the oscillator signal, C(k). The oscillator signal, C(k), may be expressed as:

$$C(k)=e^{-j\phi(k)}=\cos(\phi_c(k))-j\sin(\phi_c(k)), \qquad \text{Eq (7)}$$

where $\phi_c(k)$=p(k). The oscillator signal, C(k), is provided to phase rotator 240 and used to rotate the received modulation symbols, Y(k), as described above.

FIGS. 3 and 4A through 4C show specific embodiments of various units that make up the PLL. Other designs may be used for the phase error detector and the loop filter within the PLL. Other designs may also be used for the channel estimator and the symbol detector within the channel estimator/detector.

Figure 5:
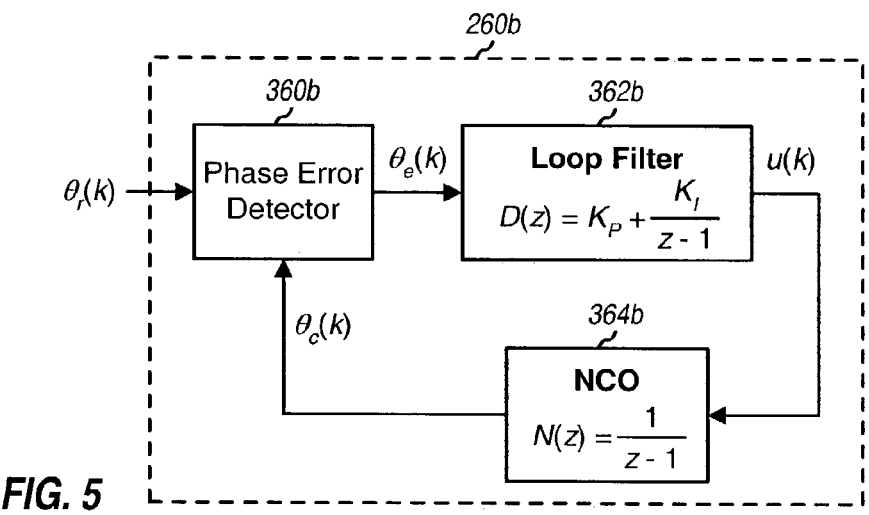
FIG. 5 shows a simplified model of the PLL for analysis.

FIG. 5 shows a block diagram of a simplified model 260b of the PLL for analysis. A phase error detector 360b receives an input signal with a phase of $\phi_r(k)$ and an oscillator signal with a phase of $\phi_c(k)$ and provides an output signal with a phase error of $\phi_e(k)$. Phase error detector 360b includes phase rotator 240 and phase error detector 360 in FIG. 3. The input signal corresponds to the serialized received modulation symbols, Y(k). The phase error, $\phi_e(k)$, may be expressed as:

$$\phi_e(k)=\phi_r(k)-\phi_c(k). \qquad \text{Eq (8)}$$

For simplicity, phase error detector 360b is assumed to have a gain of 1 in equation (8).

The overall transfer function, H(z), of the PLL may be expressed as:

$$H(z) = \frac{\phi_e(k)}{\phi_r(k)} = \frac{D(z)N(z)}{1+D(z)N(z)}, \qquad \text{Eq (9)}$$

where D(z) is the transfer function of a loop filter 362b and N(z) is the transfer function of an NCO 364b. Loop filter 362b is a second-order proportional-plus-integral type loop filter (as shown in FIG. 4B) and its transfer function may be expressed as:

$$D(z) = K_P + \frac{K_I}{z-1}.\qquad\text{Eq (10)}$$

NCO 364*b* is implemented as shown in FIG. 4C and its transfer function may be expressed as:

$$N(z) = \frac{1}{z-1}.\qquad\text{Eq (11)}$$

Substituting D(z) in equation (10) and N(z) in equation (11) into equation (9), the overall transfer function, H(z), of the PLL may be expressed as:

$$H(z) = \frac{K_P(z-1) + K_I}{(z-1)^2 + K_P(z-1) + K_I}.\qquad\text{Eq (12)}$$

The sampling rate is typically much higher than the loop bandwidth of the PLL (e.g., the sampling rate may be greater than 20 MHz and the loop bandwidth may be in the tens of KHz for an 802.11a system). In this case, the z-domain transfer function shown in equation (12) may be converted into an s-domain transfer function using the following approximations: $z = e^{j\omega T} \approx 1 + j\omega T$ or $z - 1 = j\omega T = sT$, where T is the sampling period. The s-domain transfer function, H(s), for the PLL may be expressed as:

$$H(s) = \frac{\frac{K_P}{T}s + \frac{K_I}{T^2}}{s^2 + \frac{K_P}{T}s + \frac{K_I}{T^2}}.\qquad\text{Eq (13)}$$

The overall transfer function for a second-order PLL is normally expressed in the following form:

$$H(s) = \frac{2\xi\omega_n s + \omega_n^2}{s^2 + 2\xi\omega_n s + \omega_n^2},\qquad\text{Eq (14)}$$

where $\xi$ is a damping factor and $\omega_n$ is the natural frequency. The damping factor $\xi$ and the natural frequency $\omega_n$ are design parameters that describe the shape and bandwidth of the loop response for the PLL. Loop responses for various values of $\xi$ and $\omega_n$ for a second-order PLL are well known in the art.

The gains $K_I$ and $K_P$ may be selected to obtain the desired loop response for the PLL. Equating the denominator of equation (13) with the denominator of equation (14), the following relationships are obtained:

$$\frac{K_P}{T}2\xi\omega_n \quad\text{and}\quad \frac{K_I}{T^2} = \omega_n^2.\qquad\text{Eq (15)}$$

The loop design parameters, $\xi$ and $\omega_n$, may be expressed as functions of the gains $K_I$ and $K_P$, as follows:

$$\omega_n = \frac{\sqrt{K_I}}{T} \quad\text{and}\quad \xi = \frac{K_P}{2\sqrt{K_I}}.\qquad\text{Eq (16)}$$

The loop bandwidth, $B_L$, for the PLL may be expressed as:

$$B_L = \frac{\omega_n(4\xi^2 + 1)}{4\xi}.\qquad\text{Eq (17)}$$

As shown in equations (16) and (17), the desired loop bandwidth and damping factor may be obtained by selecting the proper values for the gains $K_I$ and $K_P$. In a computer simulation for a specific OFDM system, it was found that the following values for the loop bandwidth and damping factor provide good performance: $B_L = 16.5$ KHz and $\xi = 0.15$. The optimum values for the loop bandwidth and damping factor are typically dependent on the specific system design.

Figure 6:
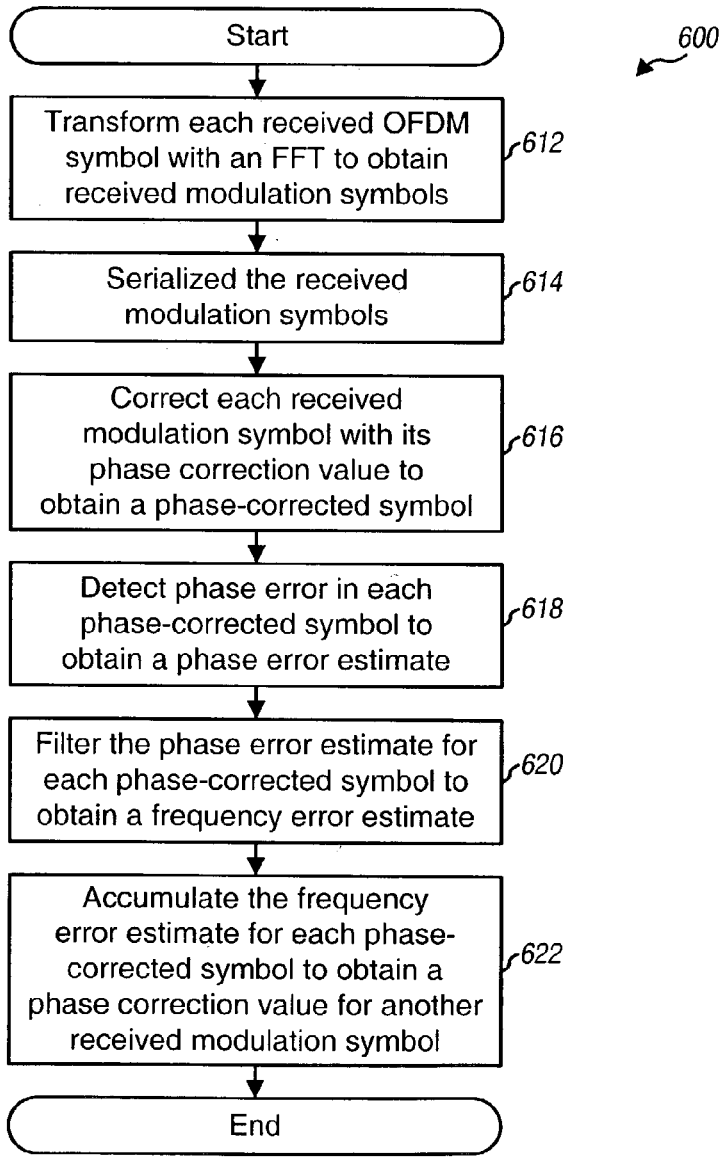
FIG. 6 shows a process for tracking residual frequency error and phase noise.

FIG. 6 shows a flow diagram of an embodiment of a process 600 for tracking residual frequency error and phase noise. Each received OFDM symbol is transformed with an FFT to obtain received modulation symbols (step 612). The received modulation symbols are then serialized (step 614). Each received modulation symbol is corrected with an independent (i.e., separate) phase correction value to obtain a phase-corrected symbol (step 616). The phase error in each phase-corrected symbol is detected to obtain a phase error estimate for that phase-corrected symbol (step 618). The phase error estimate for each phase-corrected symbol is filtered (e.g., with a second order loop filter) to obtain a frequency error estimate (step 620). The frequency error estimate for each phase-corrected symbol is further accumulated to obtain a phase correction value for another received modulation symbol (step 622). In one implementation, the phase error for each received modulation symbol is used to obtain a phase correction value for the next received modulation symbol in the serialized stream. The processing delay is one modulation symbol period for this implementation.

The techniques described herein for tracking residual frequency error and phase noise for OFDM systems can provide various benefits. First, the phase-corrected symbols are not correlated by a common phase correction value. This is because each received modulation symbol is individually corrected with an independent estimate of the phase error by the PLL. This can improve decoder performance since most decoders (e.g., Viterbi and turbo decoders) rely on their input symbols being uncorrelated. Second, the PLL may be designed with a wider loop bandwidth because the loop filter is updated on the order of the chip rate, which is typically much faster than the OFDM symbol rate. As an example, for the 802.11a system, the chip rate is 20 MHz, 64 total subbands are available, 52 subbands are used for pilot and data transmission, and the cyclic prefix is 16 chips. The PLL may then be operated at a serialized symbol rate of $f_{PLL} = (52/64) \cdot (64/80) \cdot 20$ MHz $= 13$ MHz, which is much faster than the OFDM symbol rate of $f_{OFDM} = (1/80) \cdot 20$ MHz $= 250$ KHz. The factor 52/64 accounts for the fact that only 52 pilot and data symbols are used by the PLL for each OFDM symbol and 12 guard symbols are discarded. The factor 64/80 accounts for the fact that 16 samples for the cyclic prefix are discarded from each received OFDM symbol. Operating the PLL at a faster rate allows for faster acquisition time, faster convergence to the final value, and faster response to phase changes in the received signal. Third, the PLL can operate in the decision-directed mode based solely on the received data symbols. The received pilot symbols are helpful, but not necessary, for operation of the PLL. Fourth, residual frequency error and fine phase tracking can be achieved with the closed-loop operation of the PLL.

The design described above serializes the received modulation symbols from the FFT unit. The PLL then operates on post-FFT modulation symbols to track residual frequency error and phase noise while avoiding correlation among the phase-corrected symbols. Other designs that can achieve some or all of the benefits described above may also be implemented. Some of these alternative designs are described below.

In a first alternative design, the received data symbols are decorrelated by dithering a common phase correction value. The receiver initially estimates the phase errors of the received pilot symbols and/or the received data symbols. The receiver may average the phase error estimates for each OFDM symbol period to obtain a common phase correction value for that OFDM symbol period. The receiver then applies dithering on the common phase correction value and corrects all received modulation symbols for that OFDM symbol period with the dithered common phase correction value. In particular, for each received data symbol, the receiver adds a small amount of pseudo-random noise to the common phase correction value to obtain an independent phase correction value for that received data symbol. The receiver then corrects the received data symbol with this phase correction value. The dithering of the common phase correction value with the pseudo-random noise can remove correlation among the phase-corrected symbols due to the use of the common phase correction value.

In a second alternative design, a closed-loop PLL is used on the input samples (i.e., prior to the FFT unit) to correct residual frequency error. Frequency error in the input samples may be detected based on a preamble sent by the transmitter or cyclic prefix correlation, as is known in the art. The frequency error estimates are then used by a PLL to generate an oscillator signal that is multiplied with the input samples to obtain frequency-corrected samples.

In a third alternative design, a separate set of loop filter and phase accumulator is maintained for each of the data subbands or each set of data subbands. The phase error in the received data symbols for each data subband is detected, as described above. The phase error estimates for the received data symbols for each data subband are filtered by the loop filter for that subband, and the resultant frequency error estimates are further accumulated by the phase accumulator for that subband. The received data symbols for each data subband are corrected with the phase correction values provided by the phase accumulator maintained for that subband.

The techniques described herein for tracking residual frequency error and phase noise may be used for the downlink (i.e., forward link) as well as the uplink (i.e., reverse link). For the downlink, transmitter system 110 in FIG. 1 may be part of a base station or an access point, and receiver system 150 may be part of a user terminal, a mobile station, or a wireless device. For the uplink, transmitter system 110 may be part of a user terminal, and receiver system 150 may be part of a base station.

The techniques described herein for tracking residual frequency error and phase noise may be implemented by various means. For example, these techniques may be implemented in hardware, software, or a combination thereof. For a hardware implementation, the processing units used to implement the techniques (e.g., PLL 260, channel estimator/detector 250, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 182 in FIG. 1) and executed by a processor (e.g., controller 180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of tracking frequency error in an orthogonal frequency division multiplexing (OFDM) communication system, comprising:

obtaining a plurality of received modulation symbols for at least one received OFDM symbol;

correcting each of the plurality of received modulation symbols with a respective phase correction value to obtain a corresponding phase-corrected symbol, wherein a plurality of phase-corrected symbols are obtained for the plurality of received modulation symbols;

detecting phase error in each of the plurality of phase-corrected symbols to obtain a phase error estimate for the phase-corrected symbol, wherein a plurality of phase error estimates are obtained for the plurality of phase-corrected symbols;

filtering the plurality of phase error estimates to obtain a plurality of frequency error estimates; and accumulating the plurality of frequency error estimates to obtain the phase correction value for each of the plurality of received modulation symbols, wherein the respective phase correction value used for correcting each of the plurality of received modulation symbols is computed based on the phase error estimate for the phase-corrected symbol and a pseudo-random noise value.

2. The method of claim 1, further comprising:

serializing the plurality of received modulation symbols, and wherein the correcting, detecting, filtering, and accumulating are performed on the serialized received modulation symbols, one received modulation symbol at a time.

3. The method of claim 2, wherein the plurality of received modulation symbols are serialized in an order determined by subband indices.

4. The method of claim 1, wherein the plurality of received modulation symbols include received data modulation symbols and received pilot modulation symbols.

5. The method of claim 1, wherein the plurality of received modulation symbols include only received data modulation symbols.

6. The method of claim 1, wherein the phase error estimate for each of the plurality of phase-corrected symbols is obtained based on a symbol estimate for the phase-corrected symbol and a channel coefficient estimate for a subband for the phase-corrected symbol.

7. The method of claim 1, wherein the filtering is performed with a second order loop filter.

8. The method of claim 1, wherein the filtering is performed with one loop filter, and wherein the accumulating is performed with one phase accumulator.

9. The method of claim 1, wherein the plurality of received modulation symbols are from a plurality of subbands, and wherein the filtering and the accumulating are performed separately for each of the plurality of subbands.

10. The method of claim 1, further comprising:
obtaining input samples for the at least one received OFDM symbol;
estimating coarse frequency error in the input samples; and
correcting the input samples with the estimated coarse frequency error to obtain frequency-corrected samples, and wherein the plurality of received modulation symbols are obtained from Fast Fourier transform (FFT) of the frequency-corrected samples.

11. An apparatus in an orthogonal frequency division multiplexing (OFDM) communication system, comprising:
means for obtaining a plurality of received modulation symbols for at least one received OFDM symbol;
means for correcting each of the plurality of received modulation symbols with a respective phase correction value to obtain a corresponding phase-corrected symbol, wherein a plurality of phase-corrected symbols are obtained for the plurality of received modulation symbols;
means for detecting phase error in each of the plurality of phase-corrected symbols to obtain a phase error estimate for the phase-corrected symbol, wherein a plurality of phase error estimates are obtained for the plurality of phase-corrected symbols;
means for filtering the plurality of phase error estimates to obtain a plurality of frequency error estimates; and
means for accumulating the plurality of frequency error estimates to obtain the phase correction value for each of the plurality of received modulation symbols,
wherein the respective phase correction value used for correcting each of the plurality of received modulation symbols is computed based on the phase error estimate for the phase-corrected symbol and a pseudo-random noise value.

12. An apparatus in an orthogonal frequency division multiplexing (OFDM) communication system, comprising:
a phase rotator operative to correct each of a plurality of received modulation symbols with a respective phase correction value to obtain a corresponding phase-corrected symbol, wherein the plurality of received modulation symbols are obtained from at least one received OFDM symbol, and wherein a plurality of phase-corrected symbols are obtained for the plurality of received modulation symbols;
a phase error detector operative to detect phase error in each of the plurality of phase-corrected symbols to obtain a phase error estimate for the phase-corrected symbol, wherein a plurality of phase error estimates are obtained for the plurality of phase-corrected symbols;
a loop filter operative to filter the plurality of phase error estimates to obtain a plurality of frequency error estimates; and
a phase accumulator operative to accumulate the plurality of frequency error estimates to obtain the phase correction value for each of the plurality of received modulation symbols,
wherein the respective phase correction value used for correcting each of the plurality of received modulation symbols is computed based on the phase error estimate for the phase-corrected symbol and a pseudo-random noise value.

13. The apparatus of claim 12, further comprising:
a channel estimator operative to obtain a channel coefficient estimate for each of a plurality of subbands; and
a symbol detector operative to obtain a symbol estimate for each of the plurality of phase-corrected symbols, and wherein the plurality of phase error estimates are obtained based on a plurality of channel coefficient estimates for the plurality of subbands from the channel estimator and a plurality of symbol estimates for the plurality of phase-corrected symbols from the symbol detector.

14. The apparatus of claim 12, further comprising:
a parallel-to-serial (P/S) converter operative to serialize the plurality of received modulation symbols.

15. An article of manufacture comprising:
code for obtaining a plurality of received modulation symbols for at least one received orthogonal frequency division multiplexing (OFDM) symbol;
code for correcting each of the plurality of received modulation symbols with a respective phase correction value to obtain a corresponding phase-corrected symbol, wherein a plurality of phase-corrected symbols are obtained for the plurality of received modulation symbols;
code for detecting phase error in each of the plurality of phase-corrected symbols to obtain a phase error estimate for the phase-corrected symbol, wherein a plurality of phase error estimates are obtained for the plurality of phase-corrected symbols;
code for filtering the plurality of phase error estimates to obtain a plurality of frequency error estimates;
code for accumulating the plurality of frequency error estimates to obtain the phase correction value for each of the plurality of received modulation symbols; and
a computer-usable medium configured to store the codes,
wherein the respective phase correction value used for correcting each of the plurality of received modulation symbols is computed based on the phase error estimate for the phase-corrected symbol and a pseudo-random noise value.

16. A method of tracking frequency error in an orthogonal frequency division multiplexing (OFDM) communication system, comprising:
receiving at least one OFDM symbol;
transforming each of the at least one received OFDM symbol with a Fast Fourier transform (FFT) to obtain a plurality of received modulation symbols;
serializing the plurality of received modulation symbols for the at least one OFDM symbol to obtain serialized received modulation symbols;
correcting each of the serialized received modulation symbols with a respective phase correction value to obtain a corresponding phase-corrected symbol, wherein a plurality of phase-corrected symbols are obtained for the serialized received modulation symbols;

detecting phase error in each of the plurality of phase-corrected symbols to obtain a phase error estimate for the phase-corrected symbol, wherein a plurality of phase error estimates are obtained for the plurality of phase-corrected symbols;

filtering the plurality of phase error estimates to obtain a plurality of frequency error estimates; and accumulating the plurality of frequency error estimates to obtain the phase correction value for each of the serialized received modulation symbols, wherein the respective phase correction value used for correcting each of the serialized received modulation symbols is computed based on the phase error estimate for the phase-corrected symbol and a pseudo-random noise value.

17. A method of tracking frequency error in an orthogonal frequency division multiplexing (OFDM) communication system, comprising:

obtaining received modulation symbols for at least one received OFDM symbol;

determining a phase error estimate for the received modulation symbols;

computing a separate phase correction value for each of the received modulation symbols based on the phase error estimate and a pseudo-random noise value; and correcting each of the received modulation symbols with the phase correction value for the received modulation symbol.

18. The method of claim 17, wherein the received modulation symbols include received pilot modulation symbols, and wherein the phase error estimate is determined based on the received pilot modulation symbols.

19. The method of claim 17, wherein the separate phase correction value for each of the received modulation symbols is determined by a phase locked loop (PLL) operating on the received modulation symbols.

20. The method of claim 17, further comprising:

obtaining a common phase correction value obtained for the received modulation symbols, and wherein the separate phase correction value for each of the received modulation symbols is determined by dithering the common phase correction value.

* * * * *